United States Patent [19]

Laskaris

[11] 4,279,944
[45] Jul. 21, 1981

[54] EPOXY IMPREGNATED VENTILATED WINDING

[75] Inventor: Evangelos T. Laskaris, Schenectady, N.Y.

[73] Assignee: General Electric Company, Schenectady, N.Y.

[21] Appl. No.: 973,415

[22] Filed: Dec. 26, 1978

[51] Int. Cl.³ .............................................. H02K 1/20
[52] U.S. Cl. ..................................... 427/62; 156/173; 29/598; 29/599; 29/605; 264/272.19
[58] Field of Search ......................... 29/598, 599, 605; 310/59, 45, 60 A, 61; 427/62; 156/173; 264/272

[56] References Cited

U.S. PATENT DOCUMENTS

| | | | |
|---|---|---|---|
| 3,956,724 | 5/1976 | Fagan | 335/216 |
| 3,983,427 | 9/1976 | Ulke | 310/61 |
| 4,013,908 | 3/1977 | Weghaupt | 310/61 |
| 4,095,333 | 6/1978 | Kuter | 29/598 |
| 4,129,938 | 12/1978 | Hagenbucher | 29/605 |

FOREIGN PATENT DOCUMENTS 1409450 10/1975 United Kingdom.

Primary Examiner—John D. Smith
Attorney, Agent, or Firm—Nathan D. Herkamp; James C. Davis, Jr.; Paul R. Webb, II

[57] ABSTRACT

Cooling channels are provided within a resin impregnated superconducting winding by introducing inserts between wrappings of successive layers of superconducting winding and leaving them in place during impregnation of the winding with resinous bonding materials, and thereafter extracting the inserts from the winding. The resultant spaces within the resin provide discrete coolant passages distributed throughout the superconducting winding, thereby providing circulation paths for coolant to maintain the coil at superconducting temperatures during operation thereof, including periods of rapid change in the excitation field current.

11 Claims, 10 Drawing Figures

EPOXY IMPREGNATED VENTILATED WINDING

BACKGROUND OF THE INVENTION

This invention relates to a winding structure for a superconducting winding, and more specifically, this invention relates to the structure of a superconducting winding having cooling passages therein, and the method for making such a winding.

It is known that certain materials, known as superconductors, exhibit a complete loss of electrical resistance when cooled to a temperature approaching absolute zero. To maintain this zero resistance condition during use the superconductor must be maintained in the temperature range of about 0°–10° K. When a changing field current is applied to a superconducting coil, or when a three-phase winding experiences an unbalance of the three phases, or when residual magnetic flux penetrates the rotor electromagnetic shield following a cleared fault in a superconducting generator, heating of the coil occurs. Epoxy-impregnated superconducting windings can be made to adequately carry the critical current caused by any of the known sources of winding heating, so long as the current is changed slowly. In order to provide adequate margin for transient heating in the superconducting coil, the high current density capability of epoxy-impregnated windings cannot be fully utilized in prior art designs. If the coil could be made to accept rapidly changed current without heating of the coil, full utilization of the high current density capability of superconducting windings can be realized.

In the prior art techniques such as epoxy-impregnation have been used to secure the superconductor against motion. Cooling channels were added to the coils by inserting spacers having open channels into the coil prior to resin impregnation. For example, U.S. Pat. No. 3,983,427, issued Sept. 28, 1976 to Ulke discloses placing spacing elements 40 having channels 50 therein. These spacing elements are permanent parts of the winding and, therefore, decrease the ratio of superconductor per unit volume of the winding compared to the ratio for a fully potted coil (i.e., a coil having no cooling channels and having all spaces between superconductors completely filled with bonding material). This resulted in a coil having a substantially larger physical size than the fully potted winding having the same rating.

Therefore, one object of the invention is to provide a coil having adequate cooling channels to accommodate rapid changing of the field current in a coil substantially the same size as a fully potted coil of the same rating.

Another object is to provide a method of making a coil as described above.

SUMMARY OF THE INVENTION

The instant invention provides a method of wrapping a superconducting strand surrounded by an insulator in a plurality of successive layers around a form shaped to provide the final configuration of winding desired, placing shims adjacent the outer surface of selected layers prior to wrapping the subsequent layer around the shims, impregnating the winding with a resinous bonding material, curing the resinous bonding material, and removing the shims to provide cooling passages between the selected layers of superconducting material. In a preferred embodiment, the winding is racetrack shaped, the shims are coated with a silicone release agent and with a fluorocarbon dry lubricant prior to insertion into the winding.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

MANNER AND PROCESS OF MAKING AND USING THE INVENTION

Figure 1:
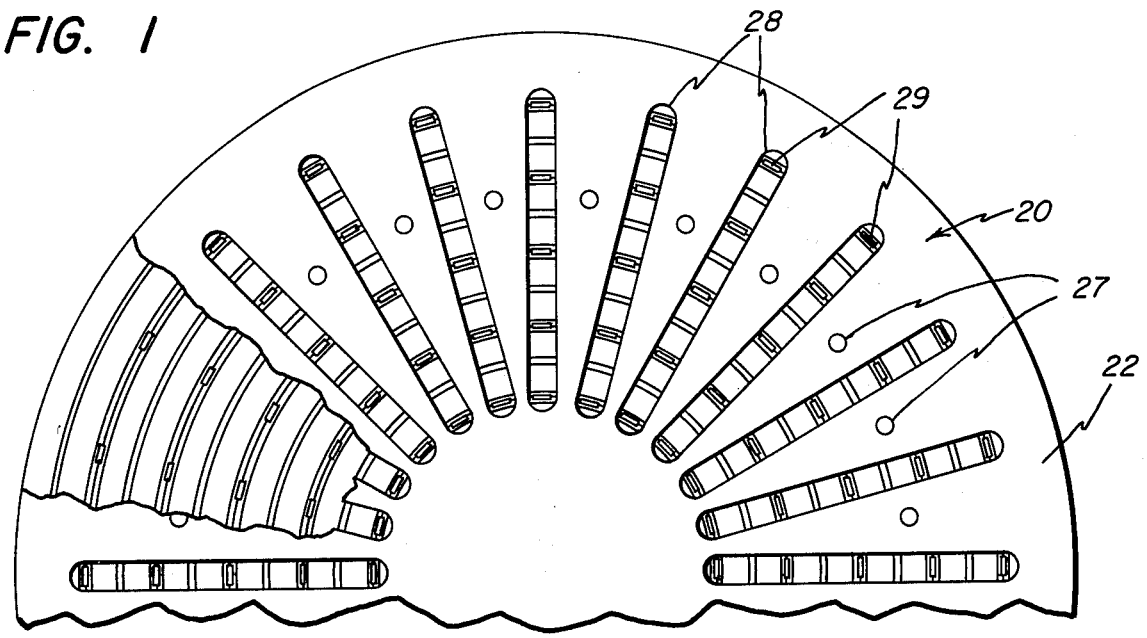
FIG. 1 is a partial top view of a flange of a form used to wrap the winding in the instant invention.

The specific features of the instant invention described herein and shown in FIGS. 1–10 are merely exemplary, and the scope of the invention is defined in the appended claims. Throughout the description and FIGS. 1–10 like reference characters refer to like elements of the invention.

Figure 3:
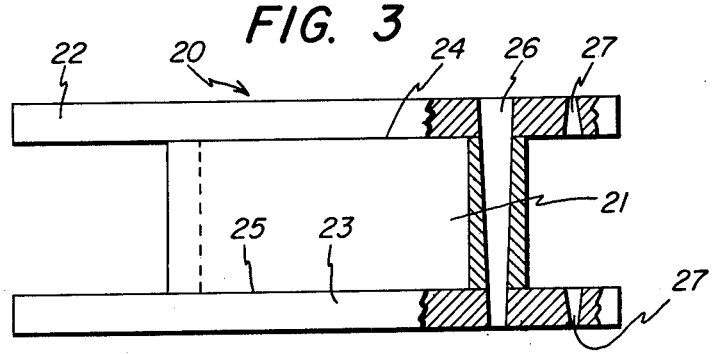
FIG. 3 is a schematic view partially in section of a form used in one preferred embodiment of the instant invention.

FIGS. 1 and 3 show top and side views, respectively, of a form 20 used in one preferred embodiment of the instant invention. The form 20 comprises drum 21 and two flanges 22 and 23 attached to the upper and lower ends 24 and 25, respectively, of drum 21. Circumferentially-spaced, tapered holes 26 are provided to insert bolts and fasten the flanges 22, 23 against the drum 21, and to facilitate removal of said bolts following the injection and curing of resinous bonding material. A plurality of feed holes 27 are provided around the circumference of flanges 22 and 23 to facilitate injection of resinous bonding material into the winding following completion of the wrapping thereof. Holes 27 are tapered to have a larger diameter at the inner surface than at the outer surface to facilitate separation of the flanges 22, 23 from the winding following curing of the bonding material. As shown in FIG. 1 radial slots 28 are provided in flange 22 to allow insertion of metallic shims 29 in a generally axial direction adjacent a selected layer of the winding at intervals equal to the spacing of slots 28. Shims 29 are shown and described as being inserted in a generally axial direction; however, the shims could be inserted at an angle to the axis of the winding but along the surface of a layer of superconductor.

Figure 2:
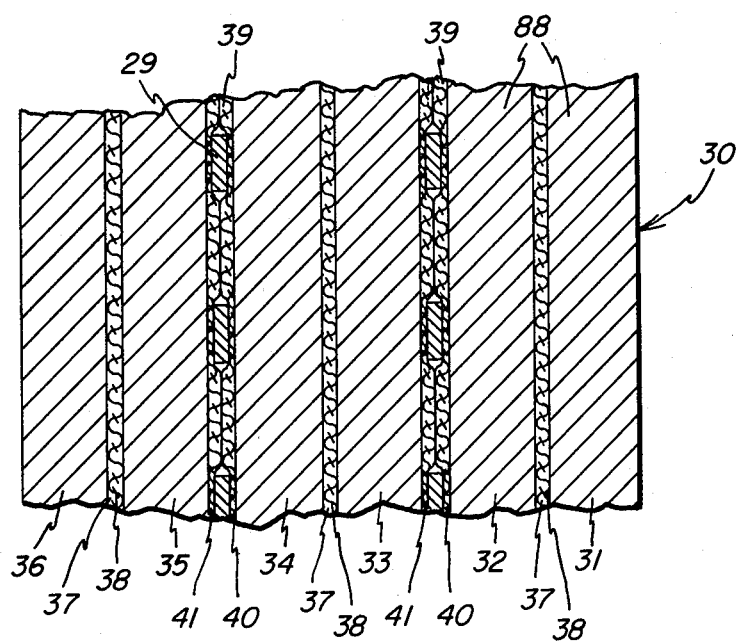
FIG. 2 is an enlarged schematic partial cross sectional view illustrating a winding/slot arrangement of the instant invention produced using a form as in FIG. 1.

In FIG. 2 is shown a portion of a winding 30 wrapped according to the instant invention. As shown a plurality of shims 29 are inserted between layers 32, 33 and generally circumferentially aligned with shims inserted between layers 34, 35 of superconductor 88. In each space 37 between layers 31, 32, layers 33, 34 and layers 35, 36 a single layer 38 of insulating, reinforcing fabric is wrapped. In each space 39 between layers 32, 33 and 34, 35 in which shims 29 are to be located two layers 40, 41 of insulating, reinforcing fabric are wrapped. One layer 40 is wrapped around the exterior of a layer 32 of wrapped superconductor, and, thereafter, a set of shims is inserted through slots 28 in flange 22 adjacent layer 40. A second layer 41 of fabric is wrapped around the combination of superconductor and shims. Layer 33 of superconductor 88 is wrapped over layer 41, followed by layer 38 of insulating fabric and layer 34 of superconductor 88. This structure provides reinforcing of the impregnant by the fabric on all sides of the cooling passages formed by extraction of the shims following curing of the impregnant, thereby, providing a crack-resistant structure for cooling passages, without permanently embedding tubes within the winding. The insulating reinforcing fabric is preferably a glass cloth, but other fabrics could be used. The fabric layers may be omitted, if no reinforcement of the impregnant is desired.

By providing two layers of superconductor between radially consecutive cooling passages formed by shims 29 in spaces 39, no portion of superconductor 88 is entirely unsupported at both sides at any location within the winding. This secures the strand of superconducting material against mechanical motion due to centrifugal forces or electromagnetic forces within the winding.

After the desired number of layers of superconductor and insulating, reinforcing fabric and sets of shims have been wound upon the form 20, the winding 30 with the shims 29 in place is impregnated with a resin-type adhesive bonding material, such as an epoxy, by a conventional impregnation process, for example, the well-known controlled vacuum process. The resinous impregnant is then cured in a conventional way, and the shims 29 are removed.

Removal of the shims 29 is facilitated by precoating the shims 29 with a release agent such as a silicone release agent of the type known as Releasil 14, a product of Midland Silicones, Ltd., and coating the silicone-coated shims with a fluorocarbon dry lubricant such as MS-143, made by Miller-Stephenson Chemical Company, Inc. The shims 29 may be removed from the winding by hand using a pliers and wedge to pull the shims from the winding, or other means, including automated equipment, may be used. Removal of the shims 29 may be further facilitated by their being tapered from a thicker cross section at flange 2 through which the shims are inserted to a thinner cross section at the opposite end. A shim may, for example, be 0.400 inch wide by 10 mils thick at the larger end and 0.375 inch wide by 10 mils thick at the narrower end. However, shims of uniform cross section can be readily removed if coated as described above.

Figure 6:
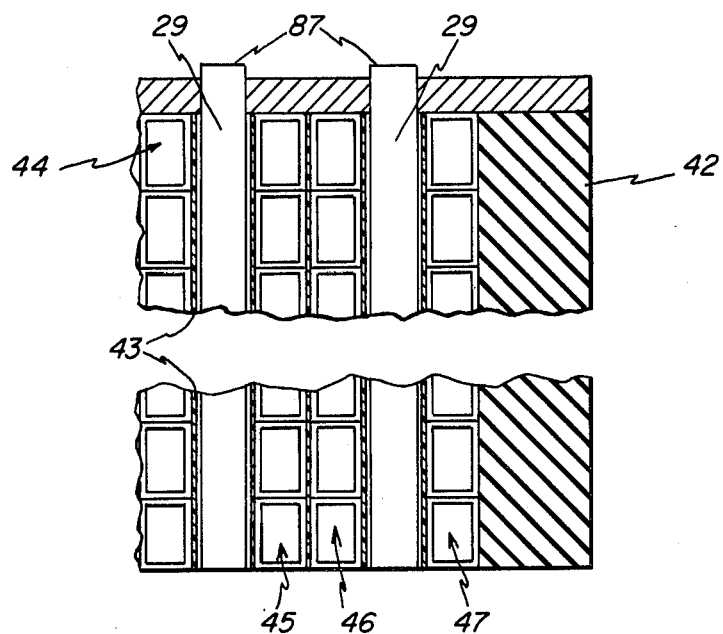
FIG. 6 is a enlarged partial schematic cross sectional view of a winding produced by the method of the instant invention.

Because of the insertion of shims 29, the resultant shape of winding 30 is not smooth but roughly polygonal. To produce a smooth exterior surface to facilitate insertion of winding 30 within a machine, or to provide a uniform clearance between winding 30 and other parts of a machine which move relative to winding 30, a thick layer 42 as shown in FIG. 6 of insulating material may be applied to the outer surface of the winding. This layer may be produced by wrapping several layers of insulating tape, such as glass filament tape, around the outer surface of the winding prior to impregnation. After curing of the bonding material, the surface is machined to the desired smooth shape.

In FIG. 6 is shown an enlarged cross sectional view of a portion of the winding including the outer thick layer 42 of insulating material. The space 43 between the shim 29 and an adjacent superconducting winding layer 44 is filled with resin following impregnation and curing. As shown, a layer 45 of superconducting material is wound around shims 29 and a second layer 46 is applied between successive circumferential sets of shims. A single layer 47 of superconductor is applied around the outermost circumferential sets of shims 29.

Figure 7:
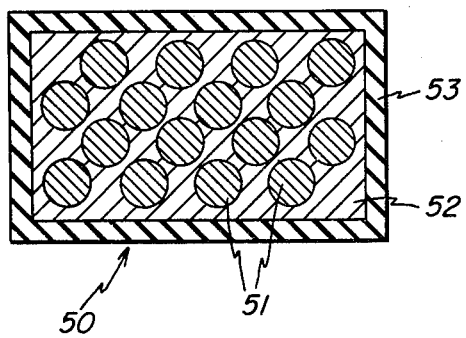
FIG. 7 is a schematic cross sectional view of one superconductor which may be used in performing the instant invention.
Figure 8:
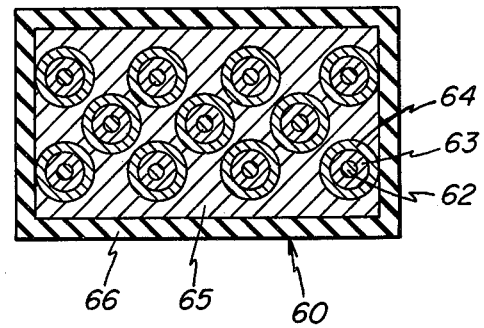
FIG. 8 is a schematic cross sectional view showing an alternative superconductor.
Figure 9:
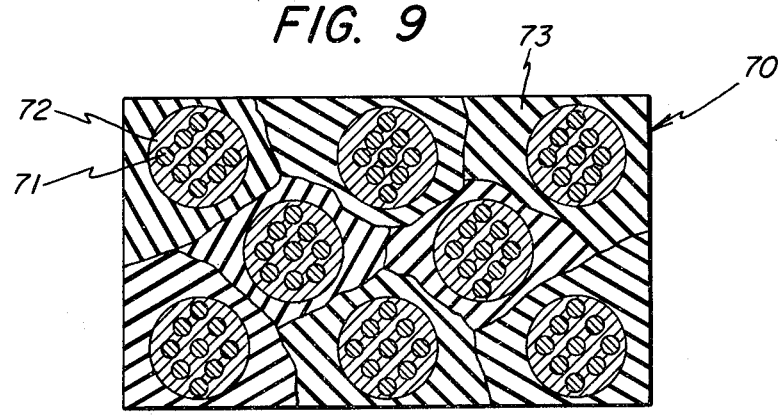
FIG. 9 is a schematic cross sectional view of a third type of superconductor which may be used in the instant invention.

FIGS. 7-9 illustrate types of superconductor which can be used in the instant invention. In FIG. 7 is shown the monolithic multifilamentary superconductor 50 having a plurality of niobium titanium wires 51 embedded in a copper matrix 52 surrounded by an insulating layer 53. In FIG. 8 is shown the type of superconductor 60 known as a mixed matrix type in which a niobium titanium wire 62 is surrounded by a copper layer 63 and a copper nickel layer 64 which is then embedded within a copper matrix 65 and surrounded by an insulating layer 66. In FIG. 9 is shown a superconductor 70 of the multistrand cable type. A niobium titanium wire 71 is embedded within a substantially circular copper matrix 72 which is surrounded by a substantially circular thick layer 73 of insulating material. A cable of such circular strands is then compacted into a rectangular shape shown in FIG. 9 which deforms the thick insulating layers 73 of the circular strands to fill the spaces between the copper matrices 72 and to form a generally rectangular exterior surface. These configurations of superconducting cable are presented as examples only, and other configurations of superconductor may be used in my invention.

Figures 4, 5:
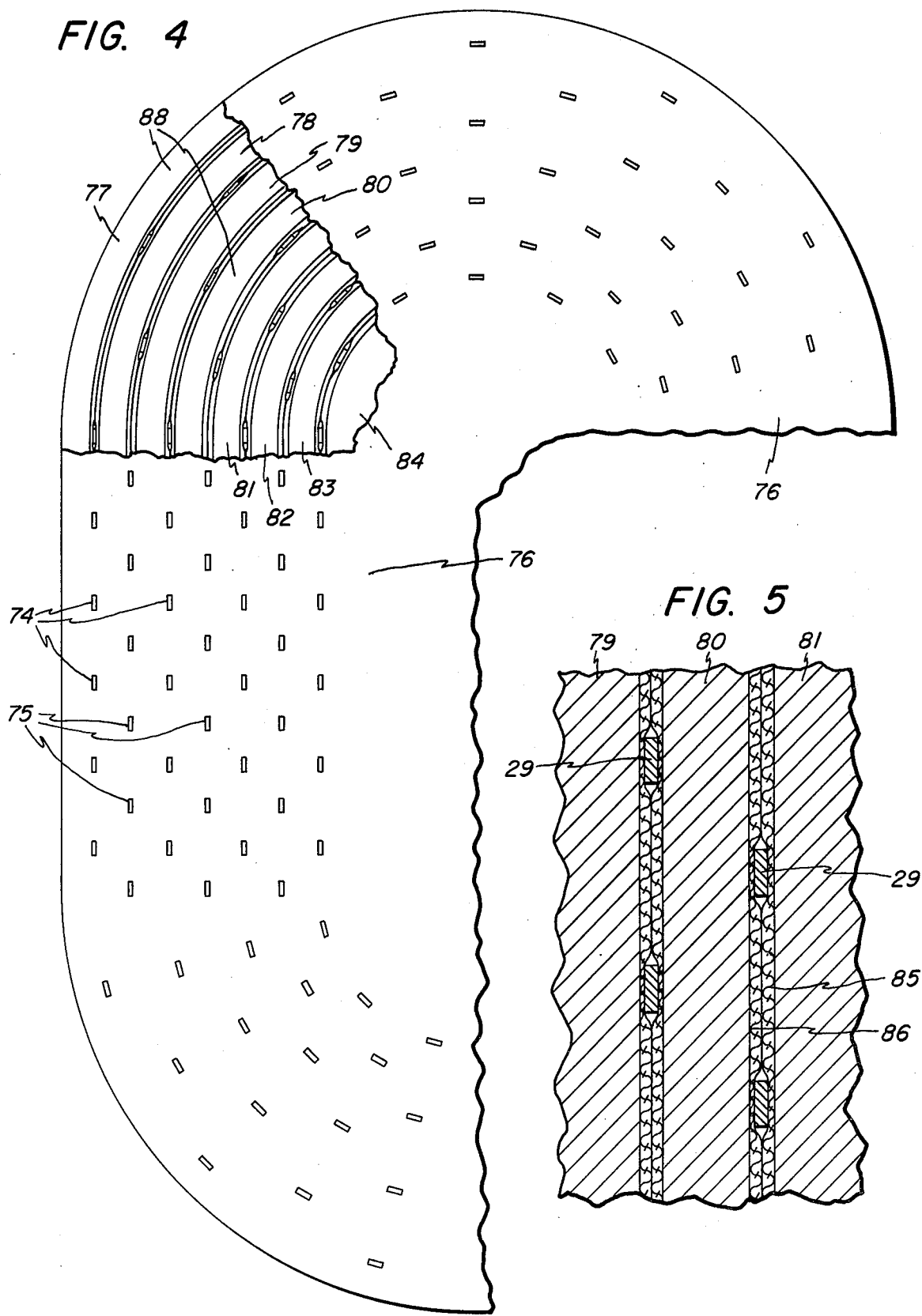
FIG. 4 is a partial top view of a form used in an alternative preferred embodiment of the instant invention.
FIG. 5 is an enlarged schematic partial cross sectional view illustrating a winding/slot arrangement of the instant invention produced using a form as in FIG. 4.

In FIG. 4 is shown a top view of the end portion of an alternate configuration of a form for making a racetrack-shaped winding. Instead of the radial slots 28 as in the configuration shown in FIG. 2, sets of individual circumferentially spaced slots 74, 75 are cut into flange 76 for insertion therethrough of separate shims 29 at the sites occupied by a set of slots 74 or 75 adjacent the radially exterior surface of each layer of superconductor 88. As shown, each slot 74 of one set is offset circumferentially from the slots 75 of the set of slots on opposite sides of each layer 77-84 of superconductor 88 so that the configuration as shown in FIG. 5 is created in the winding. In this configuration, cooling passages are provided between each pair of adjacent layers 77-84 of superconductor. By providing circumferentially offset cooling passages, the required support of the superconductor is provided at all points, since impregnant contacts the superconductor 88 at all locations opposite the cooling passages while the number of slots per unit volume of superconductor is increased relative to the embodiment of FIG. 2. In the embodiment of FIG. 5, two layers of insulating, reinforcing fabric 85, 86 are applied between each pair of layers of superconductor to provide the required crack growth resistance.

The configuration of flange 76 shown in FIG. 4 has the advantage over that shown in FIG. 2 of protecting the ends 87, shown in FIG. 6 of shims 29 (greatly enlarged) which project above flange 76 from being embedded in the impregnant. In the configuration in FIG. 2 with radial slots 28 some packing material, such as cured silicone rubber to which the impregnant will not adhere, must be provided during the step of impregnating the winding, so that after the curing step, the packing pieces may be removed, and the ends 87 of shims 29 grasped with a pliers or similar removal tool. In the configuration shown in FIG. 4, the flange 76 itself provides separation of the shims 29 so that the ends 87 may be readily grasped.

It should be understood that the radial slot arrangement illustrated in FIG. 2 could be used to make a racetrack-shaped winding, a saddle-shaped winding, or other shape of winding, as well as a circular winding. Similarly, the circumferentially-offset slot arrangement of FIG. 4 could be used to make a circular, saddle-shaped, racetrack-shaped winding or other desired shape of winding.

In the method according to my invention, a layer of a continuous strip of superconductor 88 is wrapped around drum 21 of form 20 with axial tension on the superconductor. A layer of fabric is wrapped around the layer of superconducting material, and a plurality of circumferentially-shaped shims 29 is located adjacent the fabric wrap and a second layer of fabric is wrapped around the shims. A second layer of superconductor continuous with the first layer is wrapped around the exterior of the fabric and shims with the same axial tension on the superconductor. If shims are to be placed between each of the successive layers of superconductor, a sheet of fabric is wrapped around the second layer of superconductor, the shims are inserted, and a second sheet of fabric is wrapped about the shims. If shims are not to be inserted after each layer of superconductor, a single sheet of fabric is wrapped around the superconductor and a succeeding layer of superconductor is wrapped around the superconductor and a succeeding layer of superconductor is wrapped around the coil. The steps are repeated until the coil of the desired size is completed. Then an external mold (not shown) is placed about the winding and the winding is impregnated with resin to known manner, and the epoxy is cured by a known technique. Following curing of the epoxy, the shims are removed by hand using pliers or similar devices to grasp the protruding ends of the shims and a wedge of wood or other suitable material, upon which to place the pliers to extract the shims from the cooling passages. If required, the exterior surface of the winding may be machined to the desired shape. Using shims 10 mils thick and coated with a layer of release agent and a layer of fluorocarbon dry lubricant having a total thickness of approximately 0.002 inches on each side of the shim, a cooling channel approximately 14 mils thick is produced. Of course, the shim size can be selected to produce whatever cooling channel size is desired.

The expected heating sources applying heat to the winding in the machine for which the winding is being designed will determine the winding porosity, i.e., percentage of winding volume dedicated to cooling passages. The overall winding porosity will normally be in the range of 5-20% of total winding volume. The porosity in the windings shown in FIGS. 1 and 4 is higher at the inner turns than in the outer turns. This is an appropriate construction, since the inner turns are subjected to higher intensity heating by the higher field intensity than the outer turns. This porosity variation may be reduced or eliminated, and whatever variation of porosity is desired may be incorporated into the winding by changing the number and location of slots in the slotted flange of the form or by inserting shims through only those slots located in the position of a desired cooling passage.

When installed in the machine intended to have the superconductor winding, heat generated within the coil is carried by the superconductor linearly along the superconductor until it reaches a cooling passage where contact with the cooling fluid, usually liquid helium, removes the heat from the superconductor. In this way, superconductor 88 is maintained at an adequately low temperature to maintain its resistivity at essentially zero.

Figure 10:
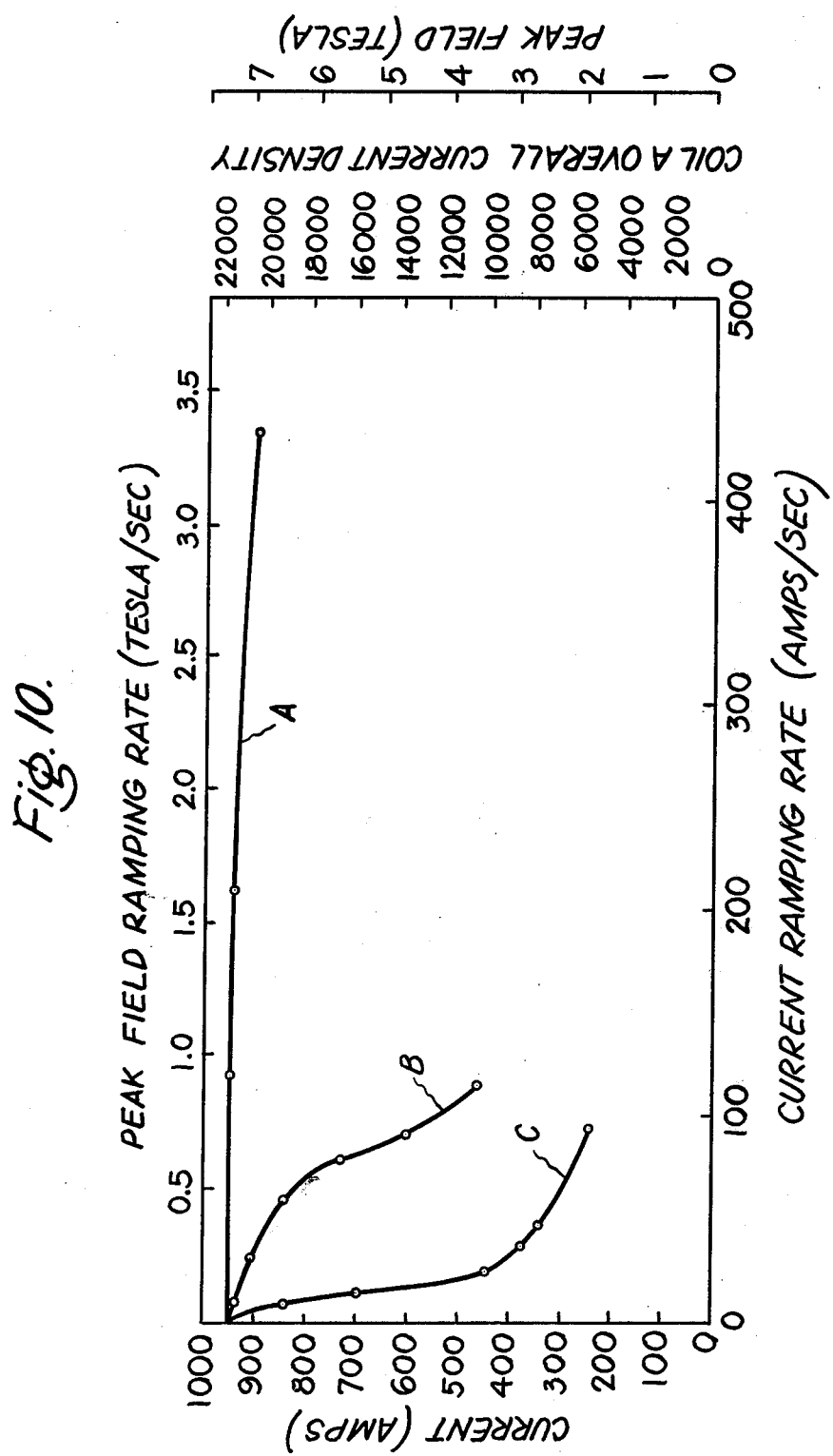
FIG. 10 is a graph illustrating one feature of a winding wrapped according to the instant invention.

FIG. 10 is a graph showing the comparison of field ramping rate in Teslas per second and current ramping rate in amps per second which a winding of my invention, curve A, will tolerate without loss of superconducting capability versus the ramping rate effect upon fully potted (i.e., fully impregnated, unventilated) windings, curves B and C. As shown by the common point of the three graphs at approximately 950 amps at a very slow current ramping rate, each of the coils retains its superconducting current carrying capacity. However, as the ramping rate increases, the current carrying capacity of each of the two fully potted coils drops off rapidly as shown by curves B and C. For coil C at a ramping rate of approximately 25 amps per second, the current carrying capacity has dropped to only 50% of its original value. For coil B at approximately 120 amps per second ramping rate, the current carrying capacity of the coil has dropped to approximately 50% of its original value. As shown by curve A, the ventilated coil of my invention provides relatively uniform current carrying capacity even when the current ramping rate exceeds 400 amps per second, or the field ramping rate exceeds 3 Teslas per second. The point on curve A for the ventilated coil at approximately 3.3 Teslas per second field ramping rate indicates that an overall current density of 20,000 amps per square centimeter, and a peak field of approximately 7 Teslas can be reached as shown by the right-hand scale. By simple calculation, this shows that in approximately 2.1 seconds the overall critical current density of 20,000 amps per square centimeter, and the peak field of 7 Teslas can be reached without loss of the superconducting state of coil A, the ventilated coil of my invention. The prior art fully potted type coil B shows a critical current density of approximately the same 20,000 amps at a field ramping rate of only about 0.25 Teslas per second. This is only approximately 1/15 the field ramping rate which can be tolerated by my ventilated coil. Coil C, as shown in the graph, reached the same critical current at only about 0.1 Teslas per second. This is less than 1/30 the field ramping rate which can be tolerated by the winding of my invention. Therefore, the invention as disclosed herein accomplishes the objective of improving ramping rate performance of an epoxy-impregnated coil without requiring the addition of mechanical, permanent cooling path structures to the coil structure. This produces a reliable, durable and inexpensive coil for high current density application.

BEST MODE

The best mode I contemplate for application of my invention is winding a coil of superconductor upon an oblong and elliptical form to provide a racetrack-shaped winding. The flanges and the drum were wrapped with a thin layer of glass filament tape prior to the wrapping of the first winding of superconducting upon the frame to prevent abrasion of the superconductor insulation. Tapered hardened stainless steel shims coated with Releasil-14, and a fluorocarbon dry lubricant of the type described above are placed in circumferentially-offset position as shown in FIG. 4 to create slots for cooling passages adjacent each layer of superconductor. The porosity at the innermost turns is 10 percent and decreases to 5 percent at the exterior turns. Each superconductor is surrounded by an insulating film material known as Formar, a polyvinyl formal insulator, and the superconductor is a niobium titanium wire embedded within a copper matrix of the monolithic multifilamentary type shown in FIG. 7. Following completion of wrapping the superconductor, a plurality of layers of glass filament tape is applied around the circumference of the coil. The coil is impregnated with an epoxy impregnant, and the circumferential surface of the coil is machined to the desired smooth shape.

I claim:

1. A method of making a superconducting winding comprising:
    wrapping a strand of superconducting material around a form having a longitudinally-extending core and a flange at each end of said core to produce a plurality of layers of superconducting material surrounding said core;
    following completion of wrapping of selected ones of said layers, and prior to wrapping of a next radially-outer layer, introducing a plurality of shims extending from one of said flanges in a substantially longitudinal direction to the other of said flanges at circumferentially spaced locations about the radially outer periphery of said selected ones of said layers;
    impregnating said plurality of layers with a resinous bonding material in a liquid state;
    curing said bonding material;
    removing said form; and
    removing said shims, whereby open channels are provided extending longitudinally through said windings and having an overall volume of about 5-20 percent of the total winding volume.

2. The method of claim 1 further comprising: wrapping a sheet of insulating fabric around the radially outer circumference of each layer of superconducting material prior to wrapping the next radially-outer layer of superconducting material; and wrapping a sheet of insulating fabric around the radially outer surface of said shims and said selected ones of said layers following said step of introducing a plurality of shims about the radially outer periphery of said selected ones of said layer.

3. The method of claim 2 further comprising wrapping a plurality of layers of insulating tape around the outer periphery of said winding prior to said step of impregnating said plurality of layers, and after said curing step machining the outer periphery of said layers of insulating tape to provide a smooth outer peripheral surface on said winding.

4. The method of claim 3 wherein the step of introducing a plurality of shims about the outer periphery of selected ones of said layers comprises introducing a plurality of shims about the outer periphery of each layer of said plurality of layers in positions circumferentially offset from shims positioned adjacent the outer periphery of the next radially inner layer of superconducting material.

5. The method of claim 4 wherein said step of introducing a plurality of shims comprises passing each of said shims through a separate slot in one flange in an axial direction until one end of said shim abuts the flange at the end of said core opposite said one flange.

6. The method of claim 5 wherein said step of passing each of said shims through a separate slot in one flange comprises passing a shim tapered to have a cross section smaller in one dimension at one end than at the other end through each said slot, such that said one end of each of said shims abuts the flange at the end of said core opposite said one flange.

7. The method of claim 3 wherein the step of introducing a plurality of shims about the outer periphery of selected ones of said layers comprises introducing a plurality of shims about the outer periphery of every second layer of superconducting material in circumferential alignment with shims positioned adjacent the outer periphery of each of the other ones of the selected layers.

8. The method of claim 7 wherein said step of introducing a plurality of shims comprises passing each of said shims through a radially elongated slot in one flange in an axial direction until one end of said shim abuts the flange at the end of said core opposite said one flange.

9. The method of claim 8 wherein said step of passing each of said shims through a slot in one flange comprises passing a shim tapered to have a cross section smaller in one dimension at one end than at the other end through each said slot, such that said one end of each of said shims abuts the flange at the end of said core opposite said one flange.

10. The method of claim 1, 6 or 9 wherein said form is oblong and said winding is racetrack-shaped.

11. The method of claim 1, 6 or 9 wherein said core is a right circular cylinder and said winding is substantially cylindrical.

* * * * *

Disclaimer 4,279,944.—*Evangelos Trifon Laskaris,* Schenectady, N.Y. EPOXY IMPREGNATED VENTILATED WINDING. Patent dated July 21, 1981. Disclaimer filed Aug. 2, 1982, by the assignee, *General Electric Co.*

Hereby enters this disclaimer to claims 1, 10 and 11 of said patent.
[*Official Gazette September 21, 1982.*]